United States Patent
Atsumi et al.

(10) Patent No.: US 9,615,000 B2
(45) Date of Patent: Apr. 4, 2017

(54) IMAGE PROCESSING APPARATUS AND IMAGE PROCESSING METHOD FOR EFFICIENTLY RESERVING MEMORY

(71) Applicant: KONICA MINOLTA, INC., Chiyoda-ku, Tokyo (JP)

(72) Inventors: Tomoyuki Atsumi, Toyohashi (JP); Takanobu Sugiyama, Toyokawa (JP); Takashi Oikawa, Toyohashi (JP); Tatsuya Kitaguchi, Toyokawa (JP); Satoshi Osako, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/844,058

(22) Filed: Sep. 3, 2015

(65) Prior Publication Data
US 2016/0088189 A1    Mar. 24, 2016

(30) Foreign Application Priority Data
Sep. 18, 2014    (JP) ................................. 2014-190552

(51) Int. Cl.
*H04N 1/41*    (2006.01)
*H04N 1/21*    (2006.01)

(52) U.S. Cl.
CPC ............ *H04N 1/41* (2013.01); *H04N 1/2104* (2013.01); *H04N 2201/0094* (2013.01); *H04N 2201/3288* (2013.01)

(58) Field of Classification Search
None
See application file for complete search history.

(56) References Cited

U.S. PATENT DOCUMENTS

| 2010/0034551 A1* | 2/2010 | Okamura | G03G 15/50 399/83 |
| 2014/0281899 A1* | 9/2014 | Mesh-Iliescu | G06F 17/2205 715/234 |

FOREIGN PATENT DOCUMENTS

| JP | 2002-132520 A | 5/2002 |
| JP | 2003-046737 A | 2/2003 |

(Continued)

OTHER PUBLICATIONS

Office Action (Notification of Reasons for Refusal) issued Dec. 20, 2016 by the Japanese Patent Office in corresponding Japanese Patent Application No. 2014-190552, and English language translation of Office Action (7 pages).

*Primary Examiner* — Andrew H Lam
(74) *Attorney, Agent, or Firm* — Buchanan Ingersoll & Rooney PC

(57) ABSTRACT

An image processing apparatus has at least one standard function to be available upon start-up of the image processing apparatus itself and at least one optional function to be available by settings. The image processing apparatus includes an image input portion that inputs image data, an encoder that encodes the input image data, a main memory that stores the encoded image data, a non-volatile memory that stores a backup copy of the image data stored on the main memory, a settings portion that allows setting the optional function available, and a controller that reserves a memory area for an optional program to execute the available optional function in the main memory, and a memory area for input of the encoded image data in the main memory, the memory area being smaller than a memory area to be reserved if the optional function is unavailable.

11 Claims, 10 Drawing Sheets

(56) References Cited

FOREIGN PATENT DOCUMENTS

| | | |
|---|---|---|
| JP | 2003-051952 A | 2/2003 |
| JP | 2004-230786 A | 8/2004 |
| JP | 2008-104164 A | 5/2008 |
| JP | 2010-041415 A | 2/2010 |

* cited by examiner

| Optional Program | Availability | Required size |
|---|---|---|
| 1 | Available | MS1 |
| 2 | Available | MS2 |
| 3 | Unavailable | MS3 |
| 4 | Unavailable | MS4 |
| 5 | Unavailable | MS5 |
| 6 | Unavailable | MS6 |

FIG.5

IMAGE PROCESSING APPARATUS AND IMAGE PROCESSING METHOD FOR EFFICIENTLY RESERVING MEMORY

This application claims priority under 35 U.S.C. §119 to Japanese Patent Application No. 2014-190552 filed on Sep. 18, 2014, the entire disclosure of which is incorporated herein by reference in its entirety.

BACKGROUND OF THE INVENTION

Field of the Invention

The present invention relates to an image processing apparatus such as a multi-function peripheral (MFP), i.e., a multifunctional digital image forming apparatus, and an image processing method for the image processing apparatus.

Description of the Related Art

The following description sets forth the inventor's knowledge of related art and problems therein and should not be construed as an admission of knowledge in the prior art.

Image processing apparatuses are commonly provided with a high-speed scanner. Once a high-speed scanner starts taking images from a document to input image data to the image processing apparatus it cannot stop until it finishes the entire document. With this scanner, a memory area equivalent to one page of raw data or compressed encoded data needs to be reserved.

There are the following types of memory for image processing apparatuses: a main memory that allows free accesses from a CPU and can be expanded as needed; a sub memory that allows only direct memory accesses (DMA) and has as much memory area only as the device configuration requires; and a backup storage device for storing a great size of encoded data.

Main memory is more expensive than sub memory because it is expandable as needed. In order to reserve a band wide enough for image transfer, a main memory and a sub memory need to be installed in such a manner that they can be accessed through different channels.

After a memory area equivalent to one page of image data is reserved in the main memory, the image processing apparatus achieves fast image inputs with an automatic document feeder attached to the scanner. In order to achieve the best speed performance, the number of pages of image data that can be stored at a time can be controlled by configuring the automatic document feeder, however, it is very common to do the same by expanding memory.

For example, there are image processing apparatuses provided with a dual scan-enabled automatic document feeder and some of them are allowed to store four A3 sized pages of image data at a time in their main memories. There are other image processing apparatuses provided with a normal automatic document feeder and most of them are allowed to store two A3 sized pages of image data at a time in their main memories.

Meanwhile, image processing apparatuses normally have at least one standard function to be available upon start-up of the image processing apparatuses themselves. The image processing apparatuses may further have at least one optional function to be available by settings upon user request.

The standard function will be available by a CPU starting a program for the standard function and the optional function will be available by a CPU starting a program for the optional function. Upon the optional function being available, the CPU requires more memory to execute a program for the optional function.

Conventionally, this problem is solved by expanding memory with extra memory for the optional function.

Meanwhile, Japanese Unexamined Patent Publication No. 2002-132520 suggests an apparatus that allocates memory on the basis of the availability of an optional function. The apparatus is configured to determine a memory map such that enough memory area can be later allocated to the optional function. On the basis of the technique disclosed in Japanese Unexamined Patent Publication No. 2002432520, the image processing apparatus can be configured to reserve a memory area for an optional function in the main memory when the optional function is installed.

The solution of expanding memory with extra memory for the optional function, however, brings a cost problem.

The solution of reserving a memory area for the optional function in the main memory does not contribute to effective use of the main memory, negatively affecting the speed performance. That is because, although all installed optional functions are not always used, memory areas for all the installed optional functions are reserved uselessly in the main memory and the reserved memory areas cannot be used for image input.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image processing apparatus having at least one standard function to be available upon start-up of the image processing apparatus itself and at least one optional function to be available by settings, the image processing apparatus including:
    an image input portion that inputs image data;
    an encoder that encodes image data being input by the image input portion;
    a main memory that stores the image data being encoded by the encoder;
    a non-volatile memory that stores the encoded image data, the encoded image data being stored on the main memory;
    a settings portion that allows setting the optional function available; and
    a controller that reserves:
    a memory area for an optional program to execute the optional function in the main memory, the optional function being set available by the settings portion; and
    a memory area for input of the encoded image data in the main memory, the memory area being smaller than a memory area to be reserved if the optional function is unavailable.

A second aspect of the present invention relates to an image processing apparatus having at least one standard function to be available upon start-up of the image processing apparatus itself and at least one optional function to be available by settings, the image processing apparatus including:
    an image input portion that inputs image data page by page;

a sub memory that stores the image data being input by the image input portion;

an encoder that encodes the image data being stored on the sub memory;

a main memory that stores the image data being encoded by the encoder;

a non-volatile memory that stores the encoded image data, the encoded image data being stored on the main memory;

a settings portion that allows setting the optional function available; and a controller that reserves a memory area for an optional program to execute the optional function in the main memory, the optional function being set available by the settings portion, wherein the controller implements a first input method or a second input method depending on the size of the memory area for the optional program, the first input method including:

making the sub memory partially store a n-th page of the image data, the image data being input by the image input portion;

making the main memory reserve a memory area for image input, the memory area being capable of storing the maximum size of the n-th page of the image data and store a copy of the image data in the reserved memory area, the image data being stored on the sub memory and encoded by the encoder; and making the non-volatile memory store a backup copy of the image data, the image data being stored on the main memory, after making the main memory reserve a memory area for image input, the memory area being capable of storing the maximum size of a (n+1)-th page of the image data, the second input method including:

making the sub memory reserve a memory area being capable of storing the maximum size of image data, the image data being input page by page by the image input portion;

making the main memory temporarily store a copy of the image data, the image data being stored on the sub memory and partially encoded by the encoder; and making the main memory clear the copy after making the non-volatile memory store a backup copy of the image data, the image data being temporarily stored on the main memory.

A third aspect of the present invention relates to an image processing method to be implemented by an image processing apparatus having at least one standard function to be available upon start-up of the image processing apparatus itself and at least one optional function to be available by settings, the image processing method including:

inputting image data;

encoding image data being input;

storing the image data on a main memory, the image data being encoded;

storing a copy of the encoded image data on a non-volatile memory, the encoded image data being stored on the main memory;

allowing setting the optional function available; and reserving:

a memory area for an optional program to execute the optional function in the main memory, the optional function being set available; and a memory area for input of the encoded image data in the main memory, the memory area being smaller than a memory area to be reserved when the optional function is unavailable.

A fourth aspect of the present invention relates to an image processing method to be implemented by an image processing apparatus having at least one standard function to be available upon start-up of the image processing apparatus itself and at least one optional function to be available by settings, the image processing method including:

inputting image data page by page;

storing the image data on a sub memory, the image data being input page by page;

encoding the image data being stored on the sub memory;

storing the image data on a main memory, the image data being encoded;

storing a copy of the encoded image data on a non-volatile memory, the encoded image data being stored on the main memory;

allowing setting the optional function available; and reserving a memory area for an optional program to execute the optional function in the main memory, the optional function being set available, wherein a first input method or a second input method is implemented depending on the size of the memory area for the optional program, the first input method including:

making the sub memory partially store a n-th page of the image data, the image data being input by the image input portion;

making the main memory reserve a memory area for image input, the memory area being capable of storing the maximum size of the n-th page of the image data and store a copy of the image data in the reserved memory area, the image data being stored on the sub memory and encoded by the encoder; and making the non-volatile memory store a copy of the image data, the image data being stored on the main memory, after making the main memory reserve a memory area for image input, the memory area being capable of storing the maximum size of a (n+1)-th page of the image data, the second input method including:

making the sub memory reserve a memory area being capable of storing the maximum size of image data, the image data being input page by page by the image input portion;

making the main memory temporarily store a copy of the image data, the image data being stored on the sub memory and partially encoded by the encoder; and making the main memory clear the copy after making the non-volatile memory store a backup copy of the image data, the image data being temporarily stored on the main memory.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 5 is a table containing a required size of a memory area for each optional program;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described with reference to the accompanying drawings.

Figure 1:
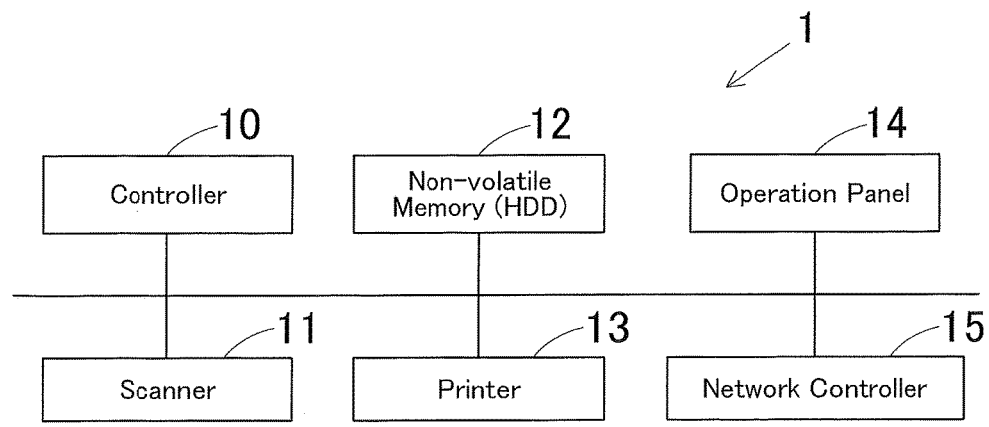
FIG. 1 is a block diagram illustrating a basic configuration of an image processing apparatus according to one embodiment of the present invention.

FIG. 1 is a block diagram illustrating a basic configuration of an image processing apparatus 1 according to one embodiment of the present invention. In this embodiment, a MFP as mentioned above, i.e., a multifunctional digital image forming apparatus having various functions such as copier function, printer function, and scanner function, is employed as the image processing apparatus 1.

The image processing apparatus 1 is provided with a controller 10, a scanner 11, a non-volatile memory 12, a printer 13, an operation panel 14, a network controller (NIC) 15, and other elements.

The controller 10 controls the image processing apparatus 1 in a unified and systematic manner such that users can use at least one of the following standard functions of the image processing apparatus 1: copier function, printer function, scanner function, facsimile function, and other functions. In addition to these functions, in this embodiment, at least one optional function is also installed on the image processing apparatus 1. Optional functions are Web browser function and voice manipulation function, for example; however, it should be understood that optional functions are in no way limited to these.

The above-mentioned standard functions are available or can be used upon a user starting up the image processing apparatus 1 by running a start-up program. Users can enable or disable each optional function. When a user enables an optional function, the optional function is available and an optional program for only the available optional function is run such that the user can use it.

The scanner 11 is an image input device for converting a document image into an image file format by reading a sheet of paper put on a platen (not shown in this figure) and by sequentially reading sheets of paper conveyed by an automatic document feeder (not shown in this figure) referred to as ADF. Furthermore, image data obtained from a document by the scanner 11, page by page, will be subjected to an image input operation, which will be later described in details.

The non-volatile memory 12 is comprised of a non-volatile memory device such as a hard disk drive (HDD). The non-volatile memory 12 stores image data obtained from a document by the scanner 11 and input by the controller 10, data received from other image processing apparatuses and user terminals, various applications, and other information. The non-volatile memory 12 protects image data in case of a power failure to the image processing apparatus 1 thanks to its characteristics as a non-volatile memory device.

The printer 13 prints image data obtained from a document by the scanner 11, print data received from user terminals, and other data in a specified print mode.

The operation panel 14 is used for user inputs and other manipulations. The operation panel 14 is provided with a display that is comprised of a liquid-crystal display with touch panel functionality for displaying messages, operation screens, and other information, and a key input section having a numeric keypad, a start key, a stop key, and other keys.

The network controller 15 maintains data transmission and receipt by controlling communication with external apparatuses on the network, such as other image processing apparatuses and user terminals.

Figure 2:
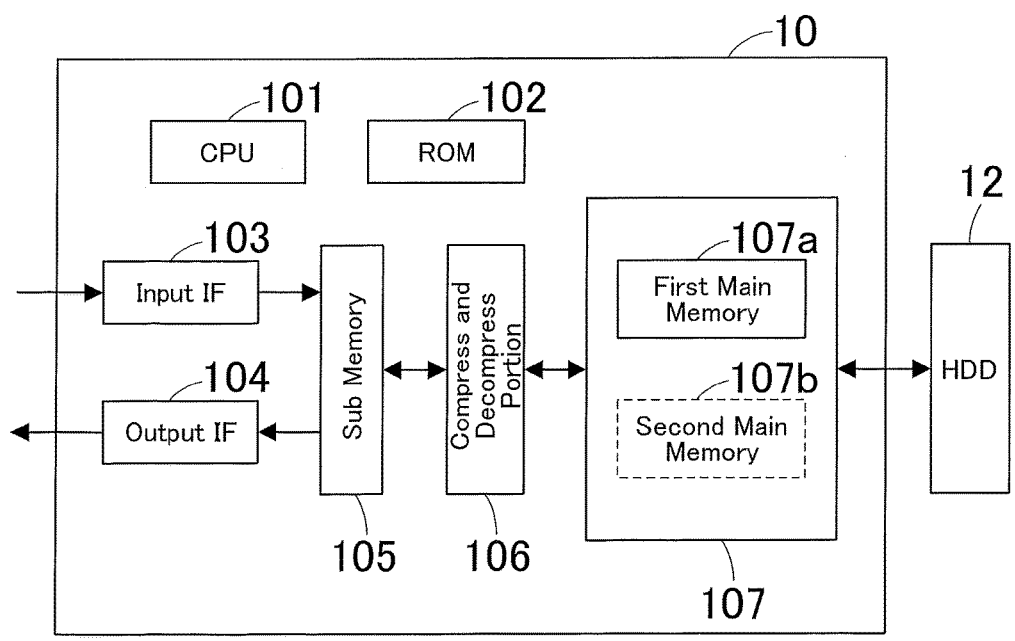
FIG. 2 is a block diagram illustrating a configuration of a controller.

FIG. 2 is a block diagram illustrating a configuration of the controller 10.

The controller 10 is provided with a CPU 101, a ROM 102, an input interface (referred to as input IF in this FIG. 103, an output interface (referred to as output IF in this FIG. 104, a sub memory 105, a compress and decompress portion 106, a main memory 107, and other elements.

The CPU 101 controls the image processing apparatus 1 in a unified and systematic manner in accordance with operation programs stored on a memory such as the ROM 102. In this embodiment, under the control of the CPU 101, image data obtained from a document by the scanner 11 is input in accordance with standard programs. Specifically, the following operations are performed under the control of the CPU 101. Memory areas are reserved in the main memory 107 and the sub memory 10 and image data is written in and read out therefrom; image data is written in and read out from the non-volatile memory 12; image data is cleared; image data is compressed (encoded) and decompressed (decoded) by the compress and decompress portion 106. Furthermore, when there is an optional function available it is executed in accordance with its optional program.

The ROM 102 is a memory that stores operation programs for the CPU 101 and other data.

The input interface 103 receives image data from the scanner 11 and other data to transfer to the sub memory 105; the output interface 104 transfers image data stored on the non-volatile memory 12, which is comprised of a HDD, for example, to transfer outside the controller 10.

The sub memory 105 temporarily stores image data input outside the controller 10 to output outside the controller 10; the sub memory 105 serves as a buffer memory. The sub memory 105 allows only direct memory accesses (DMA) and has as much memory area only as the device configuration needs.

The compress and decompress portion 106 compresses input image data in a predetermined format and decompresses compressed image data read out from the non-volatile memory 12.

The main memory 107 temporarily stores image data compressed by the compress and decompress portion 106 and compressed image data read out from the non-volatile memory 12. The main memory 107 allows free accesses from the CPU 101 and can be expanded as the need arises. The main memory 107, having a first main memory 107a as its basic configuration, can be expanded with one second main memory 107b, in this embodiment. Alternatively, the main memory 107 may be expanded with two or more second main memories 107b. Since the main memory 107 is expandable as needed as described above, it is more expensive than the sub memory 105.

In this embodiment, memory areas for a standard program to execute standard functions (also described as memory areas for standard functions in following) are reserved in the main memory 107 upon start-up of the image processing apparatus 1. When there is an optional function available, a memory area for an optional program to execute the optional function (also described as memory areas for the optional function in following) is also reserved in the main memory 107 upon start-up of the image processing apparatus 1. A required size of a memory area for each optional function is predetermined. When there are multiple optional functions available, a total required size of memory areas for all the available optional functions is calculated. Memory areas for optional functions are not prepared as being free but memory areas for only available optional functions are reserved in the main memory 107 at every start-up of the image processing apparatus 1.

As described above, a memory area is allocated to an optional function upon start-up of the image processing apparatus 1, allowing the image processing apparatus 1 to use the optional function without being kept waiting by memory swap as in the case with a virtual memory. Furthermore, a memory area for an optional function is reserved in the main memory 107, eliminating the costly need of expanding the main memory 107.

As a matter of course, when there is no optional function available, no memory area for an optional function is reserved, preventing memory shortages due to uselessly reserved memory and contributing to effective use of the main memory 107.

As understood from the above, the size of a memory area to be allocated to image input in the main memory 107 is determined by the availabilities of optional functions. When no optional function is used (when there is no optional function available), a memory area to be allocated to image input is large enough. It is large enough such that multiple image input jobs can be executed at high speed.

When there is an optional function available, the size of a memory area for image input that can be reserved in the main memory 107 is small depending on a required size of a memory area for the optional function. In order to maintain the best speed performance even when multiple jobs are executed, a right size of a memory area for image input needs to be reserved but it is different depending on the system speed that is the processing speed of the image processing apparatus 1, in other words, a right number of pages of image data needs to be managed at a time but it is different depending on the system speed. In view of these facts, in this embodiment, the size of a memory area for image input that can be reserved is controlled depending on the system speed.

Since the size of image data after being compressed is unknown, a memory area large enough to store uncompressed image data is reserved in both the sub memory 105 and the main memory 107, an image input operation is then performed. Although the reserved memory area is very large, there still is free space left in the main memory 107 if the reserved memory area is of a right size. This free memory space can be used for image inputs and outputs.

In contrast, there is no enough free space left in the main memory 107 if the reserved memory area is not of a right size. In this case, image data to be output cannot be retrieved to the file memory from the non-volatile memory 12 that is a backup storage device, seriously affecting the speed performance.

To avoid this problem, an image input method is selected upon start-up of the image processing apparatus 1. In this method, input image data is transferred part by part to the non-volatile memory 12 upon being compressed, because of the limited memory for image input in the main memory 107. As a result, enough free space is left in the main memory 107 such that an image input job and an image output job can be executed in a parallel manner. The free space in the main memory 107, however, is not always large enough and multiple jobs may not be executed at high speed.

Hereinafter selecting an image input method will be further described in details.

(1) Select an Image Input Method when the System Speed is Low

When there is no optional function available, a memory area for image input that is capable of storing the maximum size of two pages of image data is reserved in the main memory 107 and image input method 1 is then implemented. Alternatively, a memory area for image input that is capable of storing the maximum size of three or more pages of image data may be reserved.

In image input method 1, the sub memory 105 serves as a band buffer memory behaving as a ring buffer. That is, one page of image data input via the input interface 103 is stored band by band on the sub memory 105 then transferred to the compress and decompress portion 106. As a result, the reserved memory area in the sub memory 105 is capable of partially storing one page of image data.

Meanwhile, a memory area capable of storing the maximum size of one page of image data is reserved in the main memory 107 and the image data compressed by the compress and decompress portion 106 is stored in the reserved memory area. Subsequently, another memory area capable of storing the maximum size of one page of image data is further reserved in the main memory 107 before the image data stored on the reserved memory area is copied into the non-volatile memory 12. As a result, the reserved memory area in the main memory 107 is equivalent to two pages of image data in total.

In this embodiment, one A3 sized page of image data is defined as the maximum size of one page of image data and, as described above, the reserved memory area in the main memory 107 is equivalent to one page of raw data that is uncompressed by the compress and decompress portion 106. These conditions are essentially the same in the following descriptions.

When a memory area capable of storing the maximum size of two pages of image data is reserved in the main memory 107, multiple A3 sized pages of a document cannot be read sequentially. So, reading speed is low. Since the reserved memory area is capable of storing two A3 sized pages of image data as described above, multiple smaller sized pages of a document, e.g., multiple A4 sized pages of a document, can be read sequentially at high speed. Since the reserved memory area in the main memory 107 is capable of storing the maximum size of two pages of image data, there is no memory contention when image data is input by document scan and image data is retrieved from the non-volatile memory 12, in a parallel manner. So, a document scan job and a print job can be executed smoothly in a parallel manner.

When there are optional functions available, if a memory area capable of storing the maximum size of two pages of image data can be reserved in the main memory 107 after memory areas for all the available optional functions are reserved, image input method 1, which is described above, is implemented.

If a memory area capable of storing the maximum size of only one page of image data can be reserved in the main memory 107 after memory areas for all the available optional functions are reserved, image input method 2 is implemented.

In image input method 2, the sub memory 105 serves as a paging buffer memory. That is, a memory area capable of storing the maximum size of one page of image data input via the input interface 103 is reserved in the sub memory 105.

The image data stored in the sub memory 105 is sequentially decompressed part by part by the compress and decompress portion 106 and temporarily stored on the main memory 107. The image data stored on the main memory 107 is further copied into the non-volatile memory 12. After that, the image data is cleared from the main memory 107.

While the reserved memory area in the main memory 107 is capable of storing only one page of image data, the sub memory 105 works as a buffer memory. There is no memory contention when image data is input by document scan and image data is retrieved from the non-volatile memory 12, in a parallel manner. So, a document scan job and a print job can be executed smoothly in a parallel manner. Multiple A3 sized pages of a document, however, cannot be read sequentially. So, reading speed is low.

(2) Select an Image Input Method when the System Speed is Moderate

When there is no optional function available, a memory area for image input that is capable of storing the maximum size of three pages of image data is reserved in the main memory 107 and an image input operation is then performed in image input method 1. Alternatively, a memory area for image input that is capable of storing the maximum size of four or more pages of image data may be reserved.

In image input method 1, the sub memory 105 serves as a band buffer memory behaving as a ring buffer. That is, one page of image data input via the input interface 103 is stored band by band on the sub memory 105 then transferred to the compress and decompress portion 106. As a result, the reserved memory area in the sub memory 105 is capable of partially storing one page of image data.

Meanwhile, a memory area capable of storing the maximum size of one page of image data is reserved in the main memory 107 and the image data compressed by the compress and decompress portion 106 and stored on the sub memory 105 is copied into the reserved memory area. Subsequently, before the image data stored in the reserved memory area is copied into the non-volatile memory 12, another memory area capable of storing the maximum size of one page of image data is reserved in the main memory 107 and the image data is stored in this reserved memory area. Before the image data stored in this reserved memory area is copied into the non-volatile memory 12, yet another memory area capable of storing the maximum size of one page of image data is further reserved in the main memory 107. Since the reserved memory area in the main memory 107 is equivalent to three pages of image data in total, there is no memory contention when image data is input by document scan and image data is retrieved from the non-volatile memory 12, in a parallel manner. So, a document scan job and a print job can be executed smoothly in a parallel manner. Furthermore, multiple A3 sized pages of a document can be read sequentially at high speed.

When there are optional functions available, if a memory area capable of storing the maximum size of three pages of image data can be reserved in the main memory 107 after memory areas for all the available optional functions are reserved, image input method 1, which is described above, is implemented.

If a memory area capable of storing the maximum size of only two or less page of image data can be reserved in the main memory 107 after memory areas for all the available optional functions are reserved, image input method 2 is implemented. Image input method 2 is described above in the case where the system speed is low.

(3) Select an Image Input Method when the System Speed is High

When there is no optional function available, a memory area for image input that is capable of storing the maximum size of four pages of image data is reserved in the main memory 107 and image input method 1 is then implemented. Alternatively, a memory area for image input that is capable of storing the maximum size of five or more pages of image data may be reserved.

In image input method 1, the sub memory 105 serves as a band buffer memory behaving as a ring buffer. That is, one page of image data input via the input interface 103 is stored band by band on the sub memory 105 then transferred to the compress and decompress portion 106. As a result, the reserved memory area in the sub memory 105 is capable of partially storing one page of image data.

Meanwhile, a memory area capable of storing the maximum size of one page of image data is reserved in the main memory 107 and the image data compressed by the compress and decompress portion 106 and stored on the sub memory 105 is copied into the reserved memory area. Subsequently, before the image data stored in the reserved memory area is copied into the non-volatile memory 12, another memory area capable of storing the maximum size of one page of image data is further reserved in the main memory 107 and the image data is stored in this reserved memory area. As a result, the reserved memory area in the main memory 107 is equivalent to four pages of image data in total such that four pages of image data can be input sequentially.

Since the reserved memory area in the main memory 107 is equivalent to four pages of image data in total, there is no memory contention when image data is input by document scan and image data is retrieved from the non-volatile memory 12, in a parallel manner. So, a document scan job and a print job can be executed smoothly in a parallel manner. Furthermore, multiple A3 sized pages of a document can be read sequentially at high speed and multiple jobs also can be executed without sacrificing the speed performance.

If a memory area capable of storing the maximum size of four pages of image data can be reserved in the main memory 107 after memory areas for all available functions are reserved, image input method 1, which is described above, is implemented.

If a memory area capable of storing the maximum size of only three or less page of image data can be reserved in the main memory 107 after memory areas for all available optional functions are reserved, image input method 2 is implemented. Image input method 2 is described above in the case where the system speed is low.

As described above, the size of a memory area for image input that that can be reserved in the main memory 107 is controlled depending on the system speed. When there are optional functions available, an image input method is selected depending on whether or not a right size of a memory area for image input can be reserved. This allows the image processing apparatus 1 to use the optional functions without sacrificing fast image inputs.

Meanwhile, depending on the size of the main memory 107 or the types of available optional functions, a memory area for image input that is capable of storing the maximum size of even one page of image data cannot be reserved in the main memory 107 after memory areas for all the available optional functions are reserved.

To avoid this situation, this embodiment suggests a solution as described below. When rasterization function and image conversion function are available as standard functions, either a memory area for rasterization function or a memory area for image conversion function, whichever is of a larger required size, is reserved in the main memory 107. The reserved memory area is shared by rasterization function and image conversion function such that a rasterization operation and an image conversion function can be performed in a parallel manner. It should be understood that rasterization function serves to convert image data obtained by the scanner 11 or other elements into a print format and image conversion function serves to convert such image data into a file format for outbound transmissions.

For example, if a required size of a memory area for rasterization function is greater than a required size of a memory area for image conversion function, only a memory area for rasterization function is reserved in the main memory 107.

In this configuration, either a memory area for rasterization function or a memory area for image conversion function, whichever is of a smaller required size, is diverted to image input, increasing the chance of successfully reserving a memory area capable of storing the maximum size of one page of image data in the main memory 107.

Hereinafter, the operations of the image processing apparatus 1 will be described in details with reference to a flowchart.

These operations are executed by the CPU 101 in accordance with operation programs stored on a recording medium such as the ROM 102.

Figure 3:
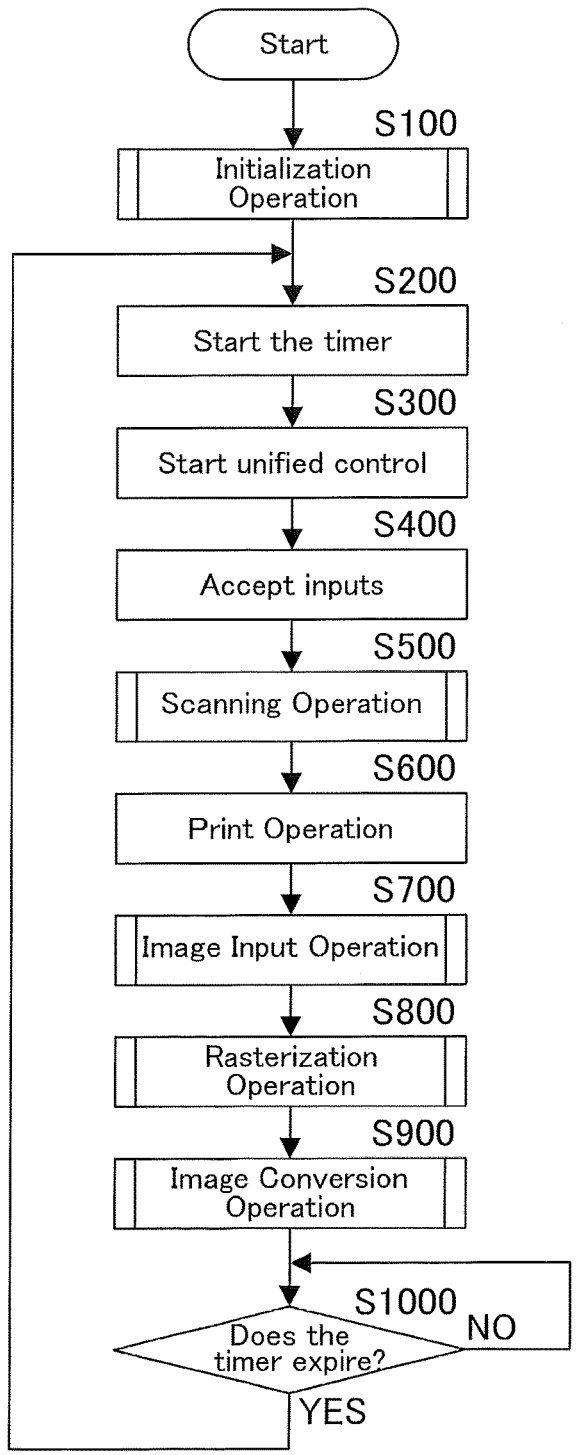
FIG. 3 is a flowchart representing an overview of the operations of the image processing apparatus.

FIG. 3 is a flowchart representing an overview of the operations of the image processing apparatus 1.

The CPU 101 is reset to start a program with an initialization operation in Step S100. The initialization operation will be later described in details.

An internal timer is started in Step S200; the image processing apparatus 1 is started to be controlled in a unified manner in Step S300; inputs from the operation panel or another interface are accepted in Step S400.

A scanning operation is performed in Step S500; a print operation is performed in Step S600; an image input operation is performed in Step S700. A rasterization operation is performed in Step S800; an image conversion operation is performed in Step S900. The scanning operation, the image input operation, the rasterization operation, and the image conversion operation will be later described in details.

In Step S1000, the flowchart waits until the timer expires (NO in Step S1000). If the timer expires (YES in Step S1000), the flowchart returns to Step S200.

Figure 4:
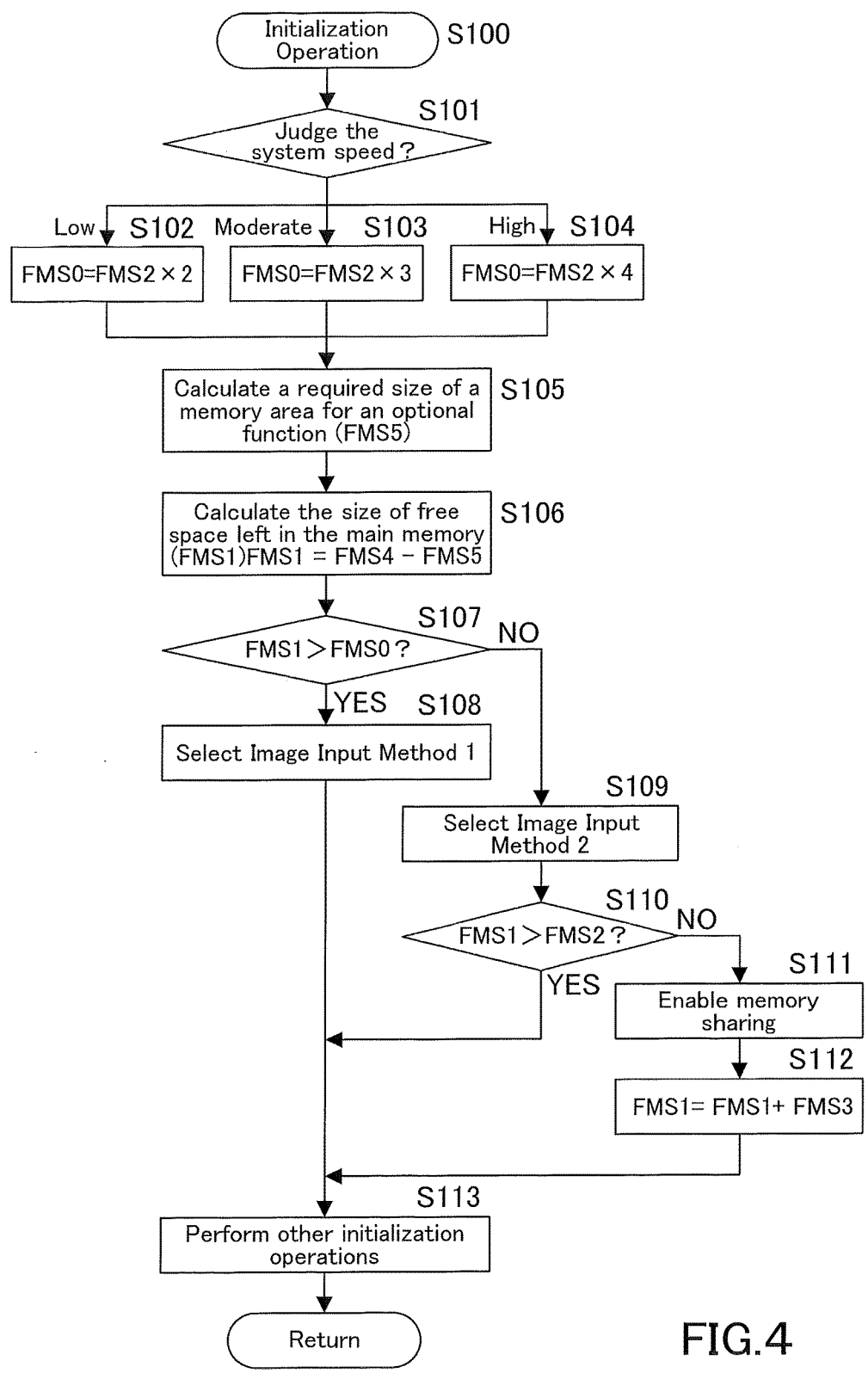
FIG. 4 is a flowchart representing an initialization operation (Step S100) out of the flowchart of FIG. 3.

FIG. 4 is a flowchart representing the initialization operation (Step S100) out of the flowchart of FIG. 3.

Specifically, in the initialization operation, a proper method of inputting image data (also referred to simply as "image input method") is selected on the basis of the system speed of the image processing apparatus 1, the size of the main memory 107, and the size of a memory area for an optional function.

The flowchart starts with judging the system speed in Step S101. The image processing apparatus 1 has a file containing defined values of the system speed for the respective system configurations, which is stored on a recording medium such as the ROM 102. The CPU 101 retrieves this file to judge the system speed. Specifically, the system speed is judged as being low if it is lower than a first predetermined value, the system speed is judged as being moderate if it is the first predetermined value or higher but it is lower than a second predetermined value (the first predetermined value < the second predetermined value), the system speed is judged as being high if it is the second predetermined value or higher.

If the system speed is judged as being low, FMS0 is calculated by the following equation: FMS0=FMS2×2, in Step S102. If the system speed is judged as being moderate, FMS0 is calculated by the following equation: FMS0=FMS2×3, in Step S103. If the system speed is judged as being high, FMS0 is calculated by the following equation: FMS0=FMS2×4, in Step S104. FMS0 represents the size of a memory area for image input to be reserved in the main memory 107, which is predetermined on the basis of the system speed. FMS2 represents the minimum size of a memory area for image input. The memory area should be capable of storing the maximum size of one page of image data.

In Step S105, FMS5 is calculated. FMS5 represents a required size of a memory area for an optional program to execute an optional function. A required size of a memory area for each optional function (each optional program) is predetermined as shown in a table of FIG. 5 which is stored on the non-volatile memory 12. In the example of FIG. 5, required sizes MS1 to MS5 of memory areas for the respective optional programs 1 to 5, are predetermined. FMS5 is calculated as a total required size of memory areas for only available optional functions. The availabilities of the optional functions are also stored on the non-volatile memory 12.

In Step S106, FMS1 is calculated by the following equation: FMS1=MFS4−MFS5. FMS1 represents the size of free space left in the main memory 107 after memory areas for available optional functions are reserved. FMS4 represents the maximum size of free space left in the main memory 107.

In Step S107, it is judged whether or not FMS1 is greater than FMS0. In other words, it is judged whether or not the free memory space can afford a required size of a memory area for image input which is determined by the system speed.

If it can afford a required size of a memory area for image input (YES in Step S107), image input method 1 is selected in Step S108. The flowchart then proceeds to Step S113. If it cannot afford a required size of a memory area for image input (NO in Step S107), image input method 2 is selected in Step S109. It is further judged in Step S110 whether or not FMS1 is greater than FMS2. In other words, it is judged whether or not the free memory space can afford the minimum size of a memory area for image input.

If it can afford the minimum size of a memory area for image input (YES in Step S110), the flowchart proceeds directly to Step S113. If it cannot afford the minimum size of a memory area for image input (NO in Step S110), memory sharing is enabled in Step S111 and FMS1 is calculated by the following equation: FMS1=FMS1+FMS3, in Step S112. The flowchart then proceeds to Step S113. FMS3 represents the size of a memory area to be shared by rasterization function and image conversion function. It is either a memory area for rasterization function or a memory area for image conversion function, whichever is of a smaller required size.

In Step S113, other initialization operations are performed. The flowchart then returns to the main flowchart of FIG. 3.

Figure 6:
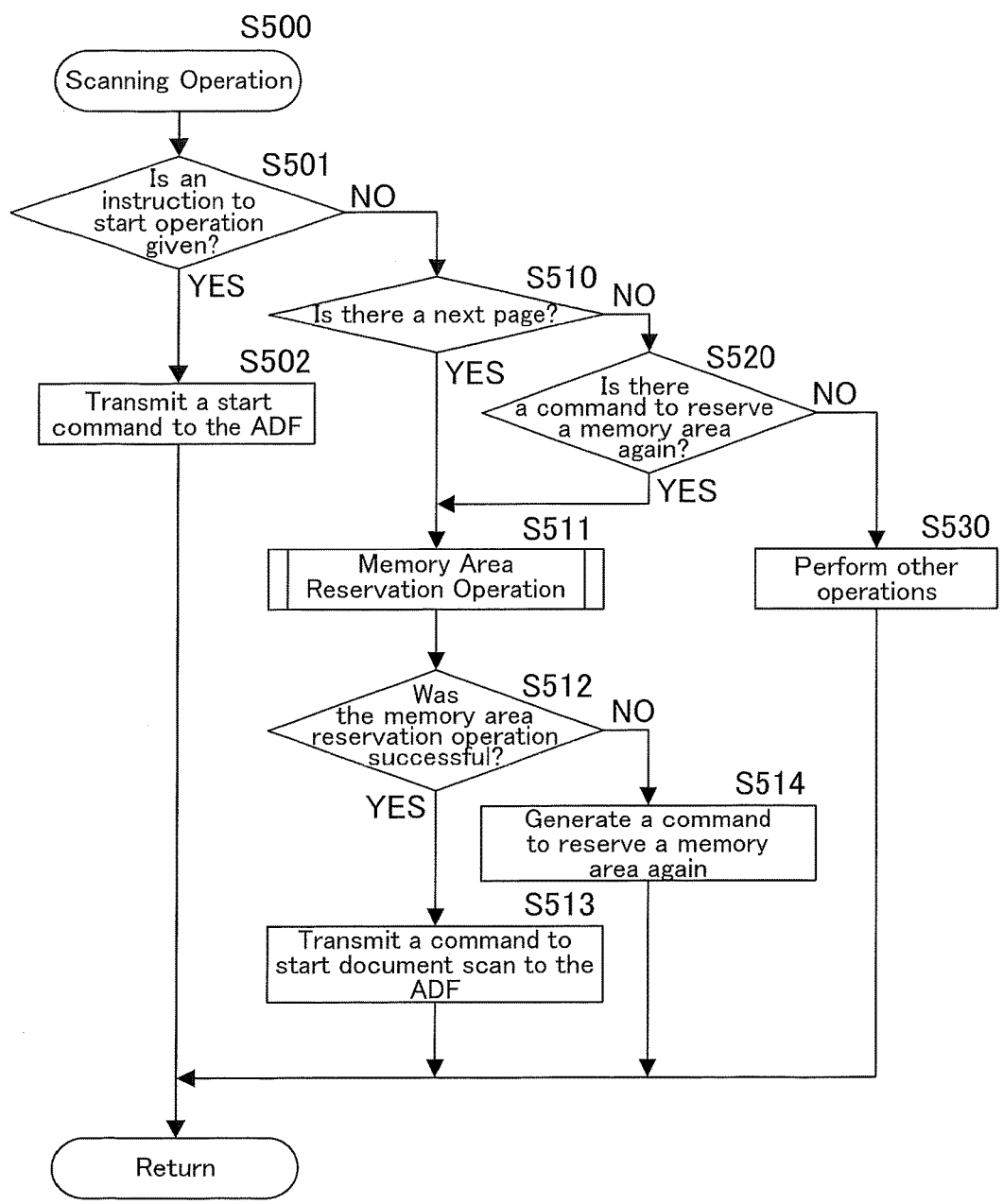
FIG. 6 is a flowchart representing a scanning operation (Step S500) out of the flowchart of FIG. 3.

FIG. 6 is a flowchart representing a scanning operation (Step S500) out of the flowchart of FIG. 3.

In Step S501, it is judged whether or not an instruction to start operation is given. If such an instruction is given (YES in Step S501), a start command is transmitted to the automatic document feeder (ADF) in Step S502. The flowchart then returns to the main flowchart. If no such instruction to start operation is given (NO in Step S501), then it is judged in Step S510 whether or not the document has a next page.

If the document has a next page (YES in Step S510), a memory area reservation operation for reserving a memory area is performed in Step S511. It is then judged in Step S512 whether or not a memory area is successfully reserved. The memory area reservation operation will be later described in details.

If the memory area reservation operation was successful (YES in Step S512), a command to start document scan is transmitted to the ADF in Step S513. The flowchart then returns to the main flowchart. If the memory area reservation operation was failed (NO in Step S512), a command to reserve a memory area again is generated in Step S514. The flowchart then returns to the main flowchart Back to Step S510, if the document has no next page (NO in Step S510), it is then judged in Step S520 whether or not there is a command to reserve a memory area again. If there is such a command (YES in Step S520), the flowchart proceeds to Step S511. If there is no command to reserve a memory area again (NO in Step S520), other operations are performed in Step S530. The flowchart then returns to the main flowchart.

Figure 7:
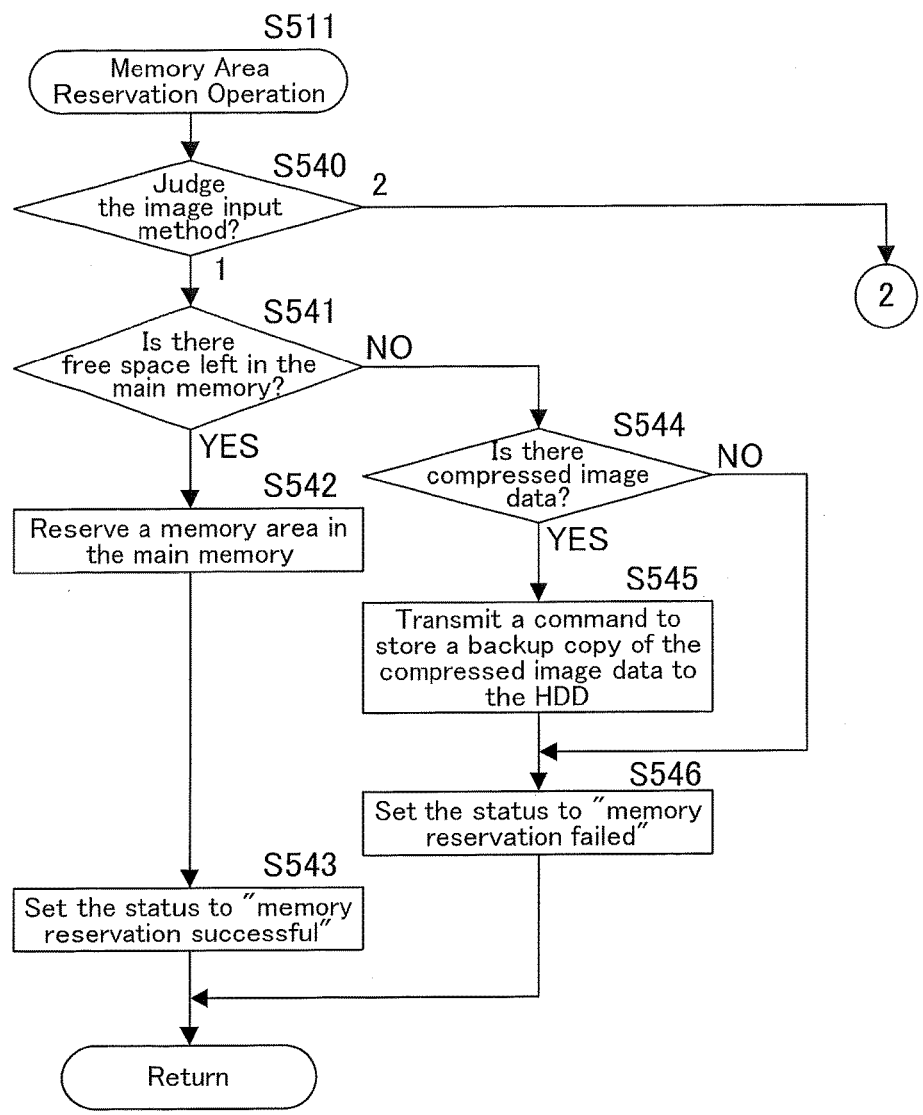
FIG. 7 is a flowchart representing a memory area reservation operation (Step S511) out of the flowchart of FIG. 6.

FIG. 7 is a flowchart representing a memory area reservation operation (Step S511) out of the flowchart of FIG. 6.

In Step S540, the image data input method is judged. If it is image input method 1, it is then judged in Step S541 whether or not there is free space left in the main memory 107. If there is free space (YES in Step S541), a memory area equivalent to one page of image data is reserved in the main memory 107 in Step S542. In Step S543, the status is set to "memory reservation successful". The flowchart then returns to the main flowchart.

Back to Step S541, if there is no free space left in the main memory 107 (NO in Step S541), then it is judged in Step S544 whether or not there is compressed image data stored on the main memory 107. If there is compressed image data stored (YES in Step S544), a command to store a backup copy of the compressed image data is transmitted to the non-volatile memory 12 in Step S545. The flowchart then proceeds to Step S546. If there is no compressed image data stored (NO in Step S544), the flowchart proceeds directly to Step S546. In Step S546, the status is set to "memory reservation failed". The flowchart then returns to the main flowchart.

In image input method 1, a memory area is reserved in the main memory 107 such that it is capable of storing the maximum size of multiple pages of image data, contributing' to fast image inputs and document scans.

Figure 8:
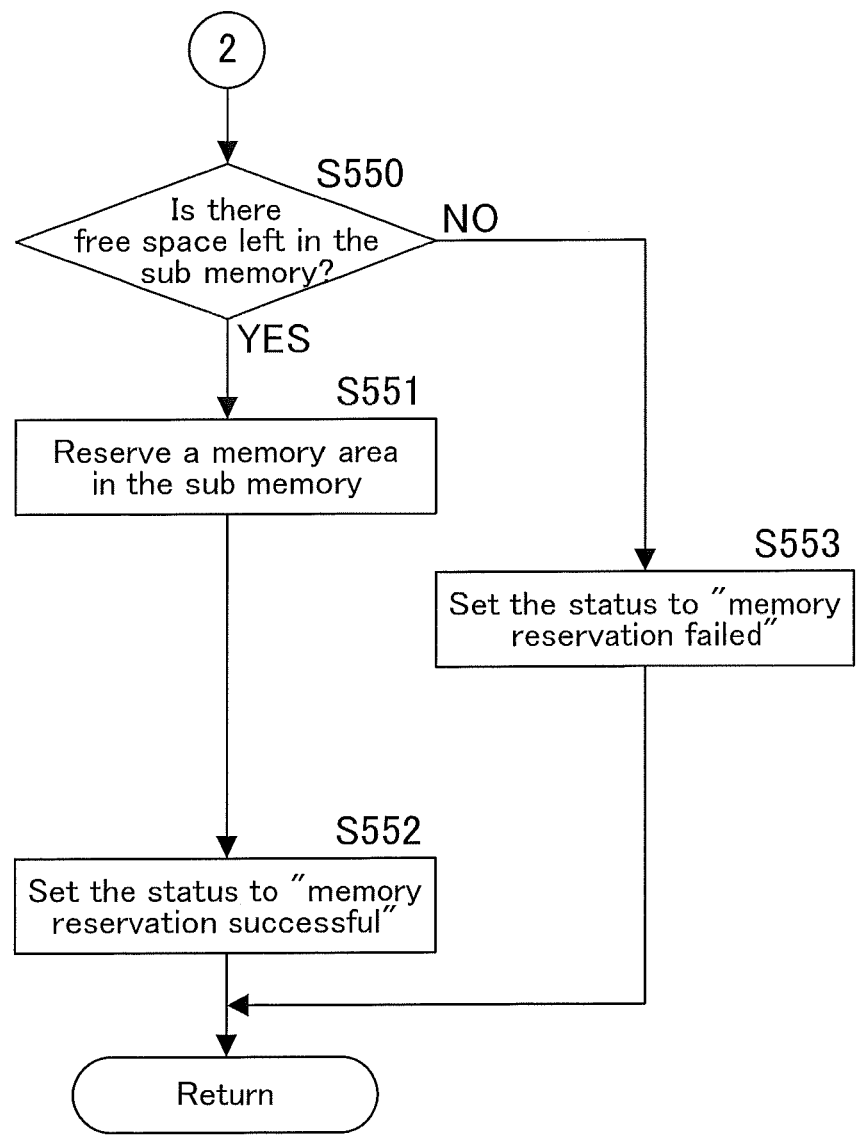
FIG. 8 is a flowchart continued from FIG. 7.

If it is image input method 2 in Step S540, the flowchart proceeds to Step S550 of FIG. 8 in which it is judged whether or not there is free space left in the sub memory 105. If there is free space left in the sub memory 105 (YES in Step S550), a memory area equivalent to one page of image data is reserved in the sub memory 105 in Step S551. In Step S552, the status is set to "memory reservation successful". The flowchart then returns to the main flowchart.

If there is no free space left in the sub memory 105 (NO in Step S550), the status is set to "memory reservation failed" in Step S553. The flowchart then returns to the main flowchart.

Figure 9:
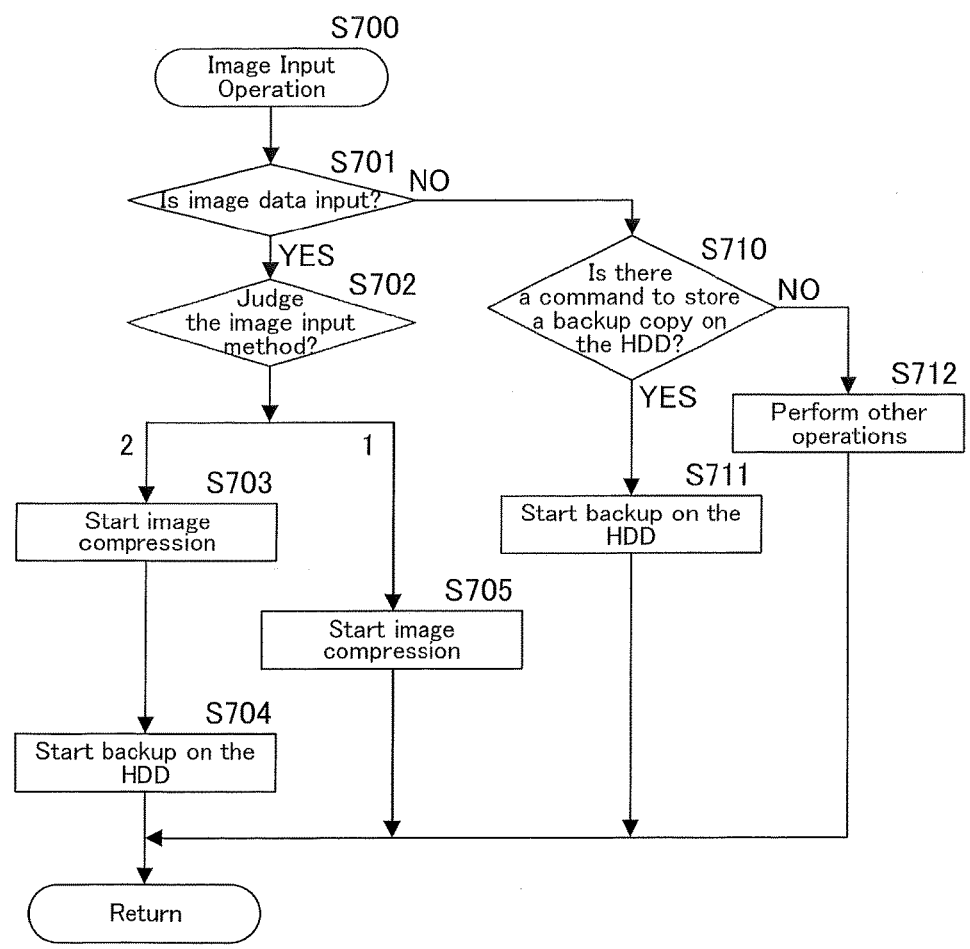
FIG. 9 is a flowchart representing an image input operation (Step S700) out of the flowchart of FIG. 3.

FIG. 9 is a flowchart representing an image input operation (Step S700) out of the flowchart of FIG. 3.

In Step S701, it is judged whether or not image data is input. If image data is input (YES in Step S701), the image data input method is judged in Step S702.

If it is image input method 2, the flowchart proceeds to Step S703 in which the image data is stored on the sub memory 105 and transferred to the compress and decompress portion 106 so as to be subjected to compression. In Step S704, the image data is stored part by part on the main memory 107 upon being compressed and a command to store a backup copy of the compressed image data is transmitted to the non-volatile memory 12. The flowchart then returns to the main flowchart. Upon completion of the backup operation on the non-volatile memory 12, the compressed image data is cleared from the main memory 107. If it is image input method 1, the flowchart proceeds to Step S705. In Step S705, the image data is stored on the sub memory 105 and transferred to the compress and decompress portion 106 so as to be subjected to compression, and the compressed image data is stored on the main memory 107. The flowchart then returns to the main flowchart.

Back to Step S701, if no image data is input (NO in Step S701), it is then judged in Step S710 whether or not there is a command to store a backup copy on the non-volatile memory 12. If there is such a command (YES in Step S710), a backup copy is stored on the non-volatile memory 12 in Step S711. If there is no such command (NO in Step S710), other operations are performed in Step S712. The flowchart then returns to the main flowchart.

In image input method 1, a band buffer is formed in the sub memory 105 and the input image data is compressed and stored band by band on the main memory 107. There may be a need to reserve another memory area for image input in the main memory 107 after the image data is stored page by page on the main memory 107; in this case, the flowchart returns to the memory area reservation operation (Step S511 of FIG. 7) and a backup copy of the image data is stored on the non-volatile memory 12. Since multiple pages of image data can be stored on the main memory 107, the input image data may be kept stored on the main memory 107, also contributing to fast printings as well.

In image input method 2, since image data can be stored only band by band in the sub memory 105, input image data is compressed and stored band by band on the main memory 107. To leave enough free space for printings and other operations in the main memory 017, a backup copy of the image data is stored band by band on the non-volatile memory 12 upon being stored band by band on the main memory 107. As a result, an image input job and a print job can be executed smoothly in a parallel manner without seriously affecting the speed performance of document scans and printings.

Figure 10:
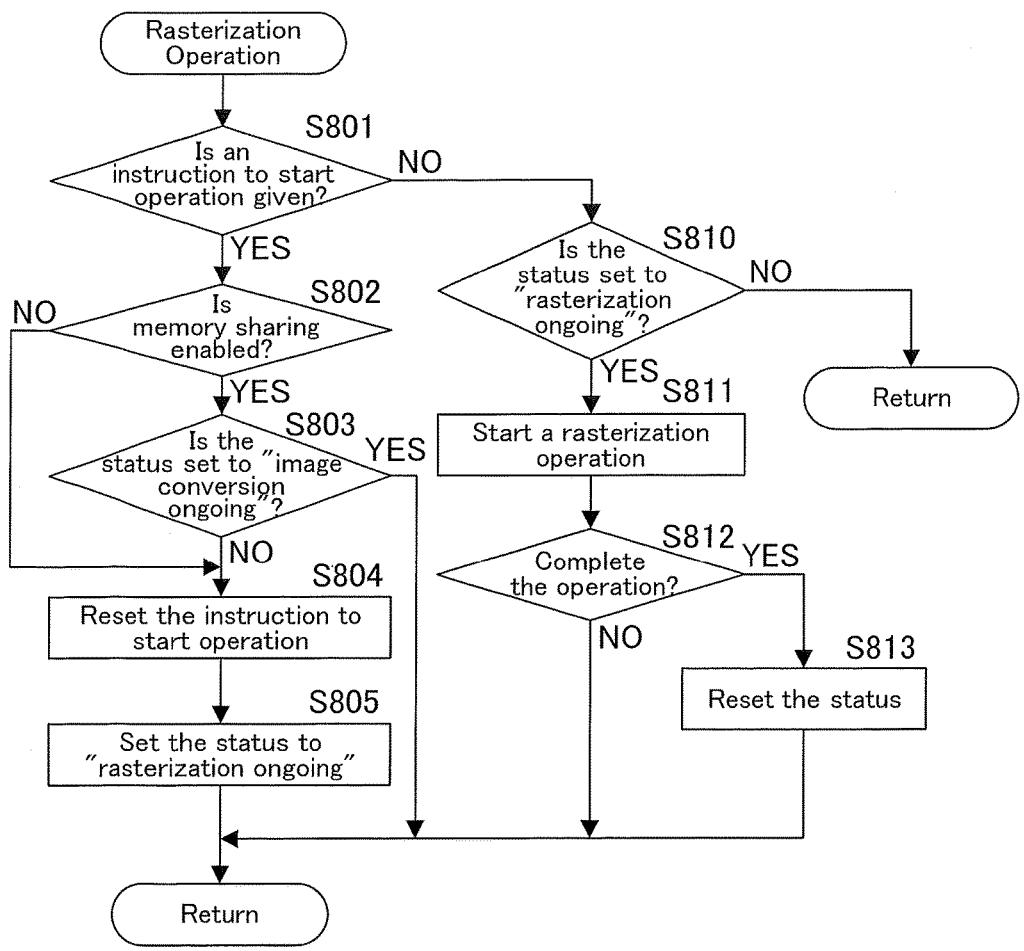
FIG. 10 is a flowchart representing a rasterization operation (Step S800) out of the flowchart of FIG. 3.

FIG. 10 is a flowchart representing a rasterization operation (Step S800) out of the flowchart of FIG. 3.

In Step S801, it is judged whether or not an instruction to start operation is given. If such an instruction is given (YES in Step S801), it is then judged in Step S802 whether or not memory sharing is enabled. If memory sharing is enabled (YES in Step S802), it is then judged in Step S803 whether or not the status is set to "image conversion ongoing". If the status is set to "image conversion ongoing" (YES in Step S803), the flowchart returns to the main flowchart to wait until an image conversion operation is completed and memory is available.

If the status is not set to "image conversion ongoing" (NO in Step S803), the flowchart proceeds to Step S804. Back to Step S802, if memory sharing is not enabled (NO in Step S802), this means that a rasterization operation and an image conversion operation can be performed in a parallel manner. The flowchart thus proceeds to Step S804.

In Step S804, the instruction to start operation is reset. The status is then set to "rasterization ongoing" in Step S805.

Back to Step S801, if no instruction to start rasterization is given (NO in Step S801), it is then judged in Step S810 whether or not the status is set to "rasterization ongoing". If the status is set to "rasterization ongoing" (YES in Step S801), a rasterization operation is started in Step S811.

In Step S812, it is judged whether or not the rasterization operation is completed. If it is not completed yet (NO in Step S812), the flowchart returns to the main flowchart. If it is completed (YES in Step S812), the status is reset in Step S813. The flowchart then returns to the main flowchart. Back to Step S810, if the status is not set to "rasterization ongoing" (NO in Step S810), the flowchart returns to the main flowchart.

Figure 11:
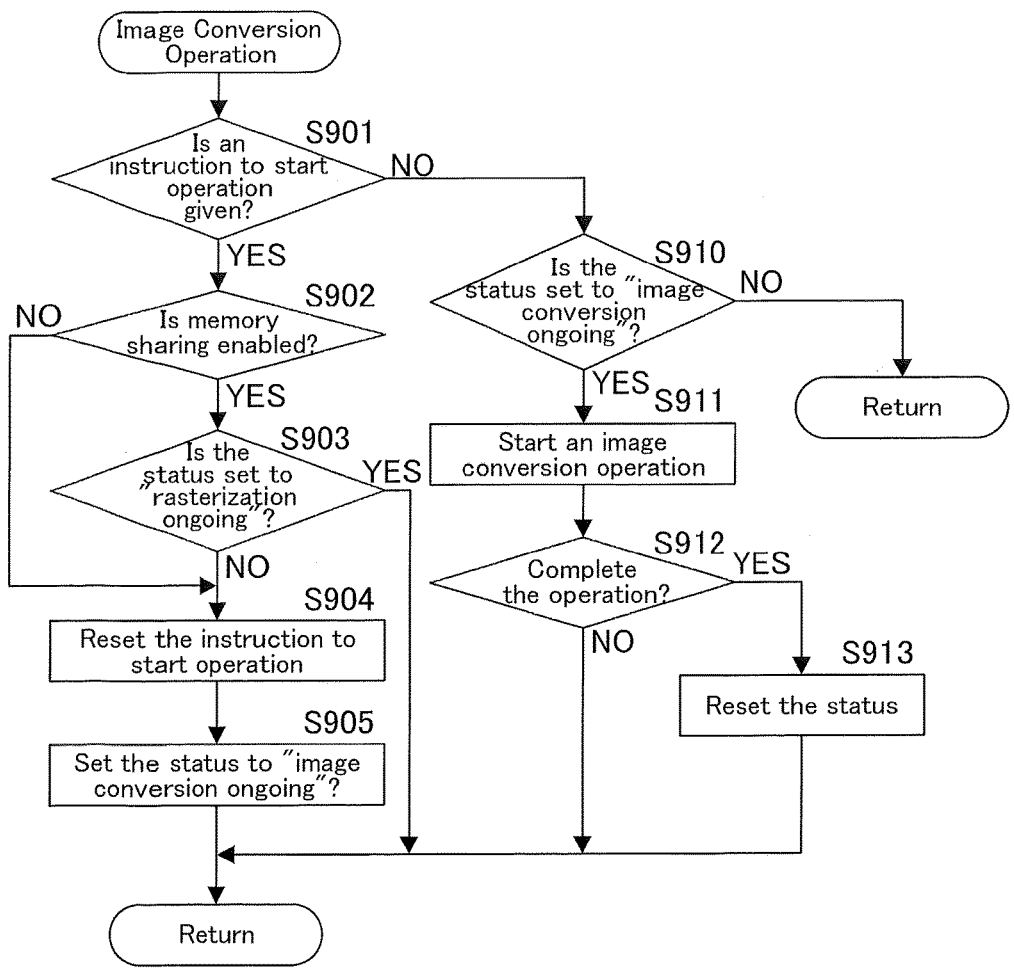
FIG. 11 is a flowchart representing an image conversion operation (Step S900) out of the flowchart of FIG. 3.

FIG. 11 is a flowchart representing an image conversion operation (Step S900) out of the flowchart of FIG. 3.

In Step S901, it is judged whether or not an instruction to start operation is given. If such an instruction is given (YES in Step S901), it is then judged in Step S902 whether or not memory sharing is enabled. If memory sharing is enabled (YES in Step S902), it is then judged in Step S903 whether or not the status is set to "rasterization ongoing". If the status is set to "rasterization ongoing" (YES in Step S903), the flowchart returns to the main flowchart to wait until a rasterization operation is completed and memory is available.

If the status is not set to "rasterization ongoing" (NO in Step S903), the flowchart proceeds to Step S904. Back to Step S902, if memory sharing is not enabled (NO in Step S902), this means that an image conversion operation and a rasterization operation can be performed in a parallel manner. The flowchart thus proceeds to Step S904.

In Step S904, the instruction to start operation is reset. The status is then set to "image conversion ongoing" in Step S905.

Back to Step S901, if no instruction to start image conversion is given (NO in Step S901), it is then judged in Step S910 whether or not the status is set to "image conversion ongoing". If the status is set to "image conversion ongoing" (YES in Step S901), an image conversion operation is started in Step S911.

In Step S912, it is judged whether or not the image conversion operation is completed. If it is not completed yet (NO in Step S912), the flowchart returns to the main flowchart. If it is completed (YES in Step S912), the status is reset in Step S913. The flowchart then returns to the main flowchart. Back to Step S910, if the status is not set to "image conversion ongoing" (NO in Step S910), the flowchart returns to the main flowchart.

As described above, in this embodiment, when there are optional functions available or enabled, memory areas for all the available optional functions are reserved in the main memory 107, eliminating the need of expanding the main memory 107 with extra memory. Furthermore, image input method 1 or image input method 2 is selected depending on a total required size of memory areas for all the available optional functions. This allows the image processing apparatus 1 to make effective use of the main memory 107 and use the optional functions without sacrificing fast image inputs.

While one embodiment of the present invention has been described in details herein it should be understood that the present invention is in no way limited to the foregoing embodiment. For example, image data obtained from a document by the scanner 11 is input in this embodiment. Alternatively, image data received by a facsimile may be input.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing apparatus having at least one standard function to be available upon start-up of the image processing apparatus itself and at least one optional function to be available by settings, the image processing apparatus comprising:
    an image input portion that inputs image data;
    an encoder that encodes image data being input by the image input portion;
    a main memory that stores the image data being encoded by the encoder;
    a non-volatile memory that stores a backup copy of the encoded image data, the encoded image data being stored on the main memory;
    a settings portion that allows setting the optional function available; and
    a controller that reserves:
    a first memory area for an optional program to execute the optional function in the main memory, the optional function being set available by the settings portion; and
    a second memory area for input of the encoded image data in the main memory, the second memory area being smaller when the optional function is available than when the optional function is unavailable,
    wherein the controller reserves the first memory area and the second memory area in the main memory upon the start-up of the image processing apparatus.

2. An image processing apparatus having at least one standard function to be available upon start-up of the image processing apparatus itself and at least one optional function to be available by settings, the image processing apparatus comprising:
    an image input portion that inputs image data page by page;
    a sub memory that stores the image data being input by the image input portion;
    an encoder that encodes the image data being stored on the sub memory;
    a main memory that stores the image data being encoded by the encoder;
    a non-volatile memory that stores a backup copy of the encoded image data, the encoded image data being stored on the main memory;
    a settings portion that allows setting the optional function available; and
    a controller that reserves a memory area for an optional program to execute the optional function in the main memory, the optional function being set available by the settings portion, wherein the controller implements a first input method or a second input method depending on the size of the memory area for the optional program, the first input method comprising:
    making the sub memory partially store a n-th page of the image data, the image data being input by the image input portion;
    making the main memory reserve a memory area for image input, the memory area being capable of storing the maximum size of the n-th page of the image data and store a copy of the image data in the reserved memory area, the image data being stored on the sub memory and encoded by the encoder; and
    making the non-volatile memory store a backup copy of the image data, the image data being stored on the main memory, after making the main memory reserve a memory area for image input, the memory area being capable of storing the maximum size of a (n+1)-th page of the image data,
    the second input method comprising:
    making the sub memory reserve a memory area being capable of storing the maximum size of image data, the image data being input page by page by the image input portion;
    making the main memory temporarily store a copy of the image data, the image data being stored on the sub memory and partially encoded by the encoder; and
    making the main memory clear the copy after making the non-volatile memory store a backup copy of the image data, the image data being temporarily stored on the main memory.

3. The image processing apparatus according to claim 2, wherein:
    a system speed is judged as being low because it is lower than a first predetermined speed; and
    the controller implements the first input method if a memory area capable of storing the maximum size of two pages of the image data can be reserved in the main memory or implements the second input method if a memory area capable of storing the maximum size of only one page of the image data can be reserved in the main memory.

4. The image processing apparatus according to claim 2, wherein:
    a system speed is judged as being moderate because it is higher than a first predetermined speed and lower than a second predetermined speed; and
    the controller implements the first input method if a memory area capable of storing the maximum size of three pages of the image data can be reserved in the main memory or implements the second input method if a memory area capable of storing the maximum size of two or less page of the image data can be reserved in the main memory.

5. The image processing apparatus according to claim 2, wherein:
    a system speed is judged as being high because it is higher than a second predetermined speed; and
    the controller implements the first input method if a memory area capable of storing the maximum size of four pages of the image data can be reserved in the main memory or implements the second input method if a memory area capable of storing the maximum size of three or less pages of the image data can be reserved in the main memory.

6. The image processing apparatus according to claim 2, wherein the sub memory is installed on the image processing apparatus itself in a fixed manner and the main memory is installed on the image processing apparatus itself such that it can be expanded.

7. The image processing apparatus according to claim 2, wherein:
    the standard functions are rasterization function converting the image data into a print format and image conversion function converting the image data into a file format for outbound transmissions, the image data being input by the image input portion;
    if the controller fails to reserve a memory area in the main memory by implementing the second input method, the memory area being capable of storing the maximum size of one page of the image data, after reserving the memory area for the optional program to execute the available optional function in the main memory, the controller reserves, in the main memory, either a memory area for the rasterization function or a memory area for the image conversion function, whichever is of a larger required size, and executes the rasterization function and the image conversion function in a parallel manner by using the reserved memory area.

8. An image processing method to be implemented by an image processing apparatus having at least one standard function to be available upon start-up of the image processing apparatus itself and at least one optional function to be available by settings, the image processing method comprising:

inputting image data;
encoding image data being input;
storing the image data on a main memory, the image data being encoded;
storing a copy of the encoded image data on a non-volatile memory, the encoded image data being stored on the main memory;
allowing setting the optional function available; and
reserving:
a first memory area for an optional program to execute the optional function in the main memory, the optional function being set available; and
a second memory area for input of the encoded image data in the main memory, the second memory area being smaller when the optional function is available than when the optional function is unavailable,
wherein the reserving of the first memory area and the second memory area in the main memory occurs upon the start-up of the image processing apparatus.

9. A non-transitory computer-readable recording medium storing an image processing program to make a computer of an image processing apparatus implement the image processing method according to claim 8.

10. An image processing method to be implemented by an image processing apparatus having at least one standard function to be available upon start-up of the image processing apparatus itself and at least one optional function to be available by settings, the image processing method comprising:

inputting image data page by page;
storing the image data on a sub memory, the image data being input page by page;
encoding the image data being stored on the sub memory;
storing the image data on a main memory, the image data being encoded;
storing a copy of the encoded image data on a non-volatile memory, the encoded image data being stored on the main memory;
allowing setting the optional function available; and
reserving a memory area for an optional program to execute the optional function in the main memory, the optional function being set available,
wherein a first input method or a second input method is implemented depending on the size of the memory area for the optional program, the first input method comprising:
making the sub memory partially store a n-th page of the image data, the image data being input by the image input portion;
making the main memory reserve a memory area for image input, the memory area being capable of storing the maximum size of the n-th page of the image data and store a copy of the image data in the reserved memory area, the image data being stored on the sub memory and encoded by the encoder; and
making the non-volatile memory store a copy of the image data, the image data being stored on the main memory, after making the main memory reserve a memory area for image input, the memory area being capable of storing the maximum size of a (n+1)-th page of the image data,
the second input method comprising:
making the sub memory reserve a memory area being capable of storing the maximum size of image data, the image data being input page by page by the image input portion;
making the main memory temporarily store a copy of the image data, the image data being stored on the sub memory and partially encoded by the encoder; and
making the main memory clear the copy after making the non-volatile memory store a backup copy of the image data, the image data being temporarily stored on the main memory.

11. A non-transitory computer-readable recording medium storing an image processing program to make a computer of an image processing apparatus implement the image processing method according to claim 10.

\* \* \* \* \*